(12) United States Patent
Kato

(10) Patent No.: US 7,145,691 B2
(45) Date of Patent: Dec. 5, 2006

(54) IMAGE READING APPARATUS

(75) Inventor: Hiroyuki Kato, Ichikawa (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 1016 days.

(21) Appl. No.: 10/046,971

(22) Filed: Jan. 17, 2002

(65) Prior Publication Data
US 2003/0133090 A1 Jul. 17, 2003

(51) Int. Cl.
G06F 15/00 (2006.01)

(52) U.S. Cl. ............ 358/1.9; 358/505; 358/2.1; 358/3.22; 358/474

(58) Field of Classification Search ............ 358/505, 358/2.1, 3.22, 474, 1.9
See application file for complete search history.

(56) References Cited

U.S. PATENT DOCUMENTS 6,014,464 A * 1/2000 Kurzweil et al. ........... 382/233
6,587,583 B1 * 7/2003 Kurzweil et al. ........... 382/164
2001/0038457 A1 * 11/2001 Moreau et al. .............. 358/1.2
2002/0033971 A1 * 3/2002 Takaki et al. ............... 358/448
2003/0081265 A1 * 5/2003 Watanabe ................... 358/474

FOREIGN PATENT DOCUMENTS

| JP | 3-217170 | 9/1991 |
| JP | 2001-24862 | 1/2001 |
| JP | 2001-119535 | 4/2001 |

* cited by examiner

Primary Examiner—David Moore
Assistant Examiner—Michael Burleson
(74) Attorney, Agent, or Firm—Foley & Lardner LLP

(57) ABSTRACT

An image reading system comprises: an image reading part for scanning an original image at a first setting during a first scanning to generate a first image data, and for scanning an original image at a second setting, which is different from the first setting, during a second scanning to generate a second image data; an image processing part for using the first and second image data to generate a new image data; and a storage part for storing the new image data generated by the image processing part.

13 Claims, 8 Drawing Sheets

IMAGE READING APPARATUS

BACKGROUND OF THE INVENTION

The present invention generally relates to an image reading system capable of monochromatic reading and color reading.

A conventional color multi-function apparatus (MFP) capable of monochromatic reading and color reading has three kinds of modes consisting of a monochromatic mode (a monochromatic fixed mode), an ACS mode (a mode in which color/monochrome is determined every page) and a full color mode (a color fixed mode). If the SCS mode is set when a color/monochrome mixing original is color-copied, a "pre-scanning" operation is carried out prior to an actual scan every page in order to determine color/monochrome every page. If the time required to carry out the pre-scanning operation intends to be omitted, it is required to select the full color mode. However, if the full color mode is selected in the case of a color MFP having, e.g., a four-rotation drum, it is a waste of time since the color MFP always causes the drum to make four rotations even in the case of a monochromatic original.

On the other hand, in a case where a color scan is carried out by means of a low-price personal flat-bed scanner, an actual scan is often carried out after a pre-scan is carried out to verify the scanning condition of an original and after the user carries out a scan setting.

In addition, if resolution is increased (400 dpi through 600 dpi) when a color scan is carried out, there is a problem in that the file size increases. Moreover, in the case of a photographic image or the like, the JPEG compression is used for decreasing the file size. In this case, when compressibility is increased, there is not a serious problem if only the compressed image includes only a photograph, but there is a problem in that characters deteriorate if the compressed image include characters or the like.

As described above, if the conventional color image reading system reads an image at a high resolution (600 dpi or the like), the file size increases. Therefore, if the system is used as a network scanner, there is a problem in that it takes a lot of time to network-transfer a file, so that it is difficult for the user to process an image file after scanning. There is also a problem in that an HDD for storing image files must have a large capacity. Moreover, if a color/monochrome mixing original is scanned, it is required to carry out a pre-scan every page in order to determine color/monochrome every page, so that there is a problem in that it takes a lot of time to carry out processing.

SUMMARY OF THE INVENTION

It is therefore an object of the present invention to provide an image reading system capable of decreasing the size of an image file after scanning.

In order to accomplish the aforementioned object, according to one aspect of the present invention, an image reading system comprises: image reading means for scanning an original image at a first setting during a first scanning to generate a first image data, and for scanning an original image at a second setting, which is different from the first setting, during a second scanning to generate a second image data; image processing means for using the first and second image data to generate a new image data; and storage means for storing the new image data generated by the image processing means.

In the above described image reading system, the first setting is preferably a setting for a color low resolution, and the second setting is preferably a setting for a monochromatic high resolution. In addition, the original image scanned at the first setting is preferably the same as the original image scanned at the second setting. Moreover, the page number of the first image data is preferably the same as the page number of the second image data.

In order to accomplish the aforementioned object, according to another aspect of the present invention, an image reading system comprises: image reading means for scanning an original image to generate an image data; storage means for storing the image data; and image processing means for merging the image data, which has been stored in the storage means, to generate a new image data, wherein the new image data generated by the image processing means is stored in the storage means again.

The above described image reading system preferably further comprises image data assigning means for allowing a user to assign the image data which has been stored in the storage means. In this case, the image reading system preferably further comprises scan setting determining means for determining a scan setting for an original image, which is to be newly scanned, on the basis of an image setting for the image data assigned by the image data assigning means. In addition, the original image having stored in the storage means is preferably the same as an original image which is to be newly scanned. Moreover, the page number of the image data having stored in the storage means is preferably the same as the page number of an image data which is to be generated by a new scanning.

In order to accomplish the aforementioned object, according to a further aspect of the present invention, an image reading system comprises: image reading means for scanning an original image to generate an image data; storage means for storing the image data; and image processing means for using a predetermined criterion to merge a plurality of image data to convert the plurality of image data to one image data when the storage means stores the plurality of image data.

In the above described image reading system, when the storage means stores a color low resolution image data and a monochromatic high resolution image data, the image processing means preferably carries out an image processing for regarding a pixel of a predetermined threshold or less as a monochromatic pixel in the color low resolution image data to mask the pixel with white, and for replacing the pixel with the monochromatic high resolution image data. In addition, the above described image reading system preferably further comprises threshold setting means for allowing a user to set the threshold. In this case, the threshold setting means is preferably provided by a liquid crystal display or a UNIX international (UI) such as Web, or an instruction sheet. Moreover, when the storage means stores a color low resolution image data and a monochromatic high resolution image data, the image processing means may carry out an image processing for regarding a portion of a predetermined evaluation function as a monochromatic portion in the color low resolution image data to mask the portion with white, and for replacing the portion with the monochromatic high resolution image data.

In order to accomplish the aforementioned object, according to a still further aspect of the present invention, an image reading system comprises: storage means for scanning an original image to generate an image data; storage means for storing the image data; image processing means for carrying out a layout analysis every page with respect to a color low resolution image data, for using a monochromatic high resolution image data with respect to a portion determined as a character portion, and for using the color low resolution image data with respect to a portion other than the character portion, to carry out a merge image processing, when the storage means stores the color low resolution image data and the monochromatic high resolution image data.

The image reading system according to the present invention scans an original image twice, and carries out a first scanning operation at a color low resonance and a second scanning operation at a monochromatic high resolution. The image reading system uses temporary two image data generated by two scanning operations. With respect to the respective image data, a color low resolution image data is used for a portion, such as a color image or a graphic portion, in which it is not always required to raise resolution, and a monochromatic high resolution image data is used for a portion, such as a character portion, in which a high resolution is required, so that it is possible to reduce the file size while the quality of the original image is held to some extent.

As a method for determining a color image, a graphic portion or a character portion, there is a method using an RGB threshold values. For example, in order to determine that a portion is black, an image scanned at a color low resolution, and a threshold having RGB values approximating zero is used. With respect to a portion in which the RGB values are smaller than the threshold, a monochrome high resolution is used, and with respect to a portion in which the RGB values are larger than the threshold, a color low resolution is used. There is also a method for carrying out a layout analysis with respect to each page of image data after scanning and for using a monochromatic high resolution image data with respect to a portion determined as a character portion, and a color low resolution image data with respect to a portion determined as an image/graph portion. This method has advantages in that the file size decreases and the processing time for generating a file is the same or shorter, as compared with case where one scanning operation is carried out at a color high resolution to generate a file.

BEST MODE FOR CARRYING OUT THE INVENTION

Referring now to the accompanying drawings, the preferred embodiment of an image reading system according to the present invention. A case where a digital copying machine is provided with the preferred embodiment of an image reading system according to the present invention will be described below.

Figure 1:
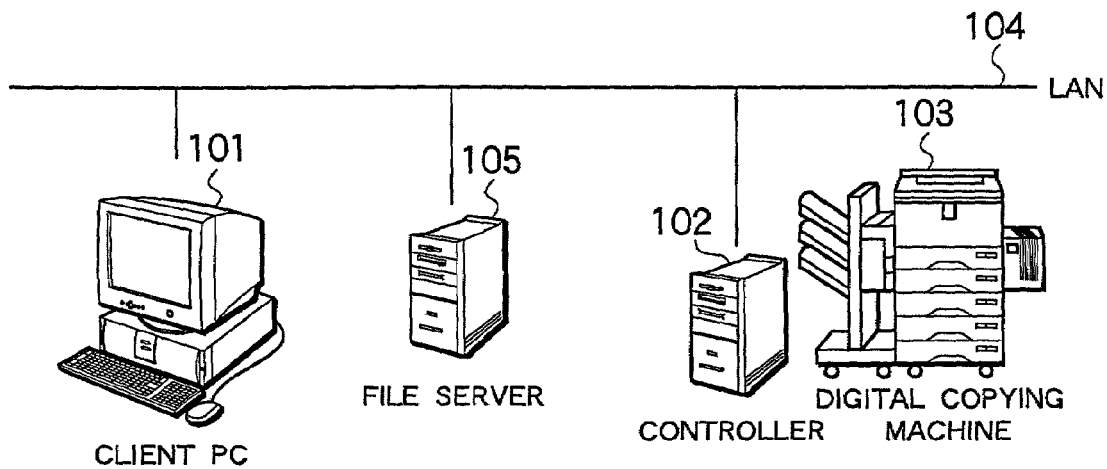
FIG. 1 is a general view showing a system to which a preferred embodiment of an image reading system according to the present invention can be applied.

FIG. 1 is a general view showing a system to which a preferred embodiment of an image reading system according to the present invention can be applied.

As shown in FIG. 1, on a network, there are connected a digital copying machine 103, a controller 102 for controlling the scan function/print function and so forth of the digital copying machine 103, a file server 105, and a client PC 101 for starting an application to indicate printing, for starting an Web client to set the controller, and so forth.

Figure 3:
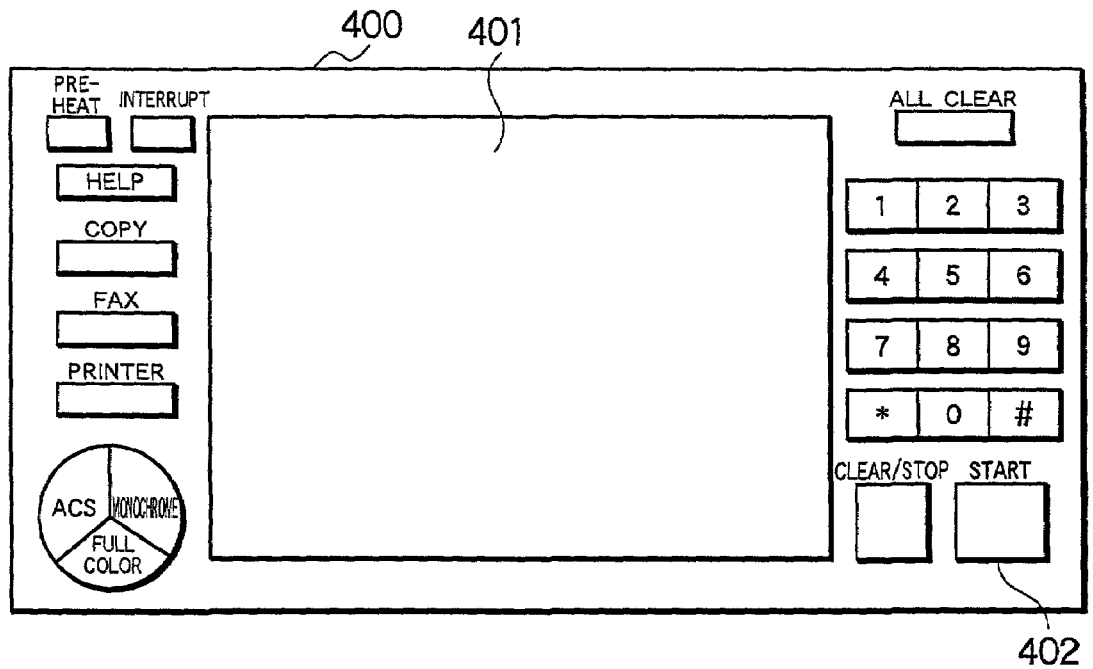
FIG. 3 is a schematic diagram of a digital copying machine to which the preferred embodiment of an image reading system according to the present invention can be applied.

The digital copying machine 103 comprises a scanner for scanning an original paper to digitize original data as image data, a printer for printing image data on a paper, an operating part shown in FIG. 3, a CPU for controlling the whole system, a memory and HDD for storing a control program and management data, and a communication part connected to the controller 102. The digital copying machine 103 has the function of copying an original paper to a paper. Since this function is the same function as that of conventional copying machines, the descriptions thereof are omitted.

The controller 102 has a network print function of receiving a print command, which is described by a page description language (PDL), from a document preparing software, which operates on the client PC 101, to prepare image data from the PDL to transfer the image data to the digital copying machine 103. In addition, the digital copying machine 103 has a printing function of printing the image data transferred from the controller 102. Since this function is the same as that of general network printers, the descriptions thereof are omitted.

The controller 102 also has an MFP function of being capable of carrying out data transfer, trimming, rotation and so forth by operating a control panel of the digital copying machine 103 so that the image data generated by scanning the original image can be edited and processed on the client PC 101. Moreover, the controller 102 has an I/F, such as network TWAIN, so as to be capable of making a reference on the network.

Figure 2:
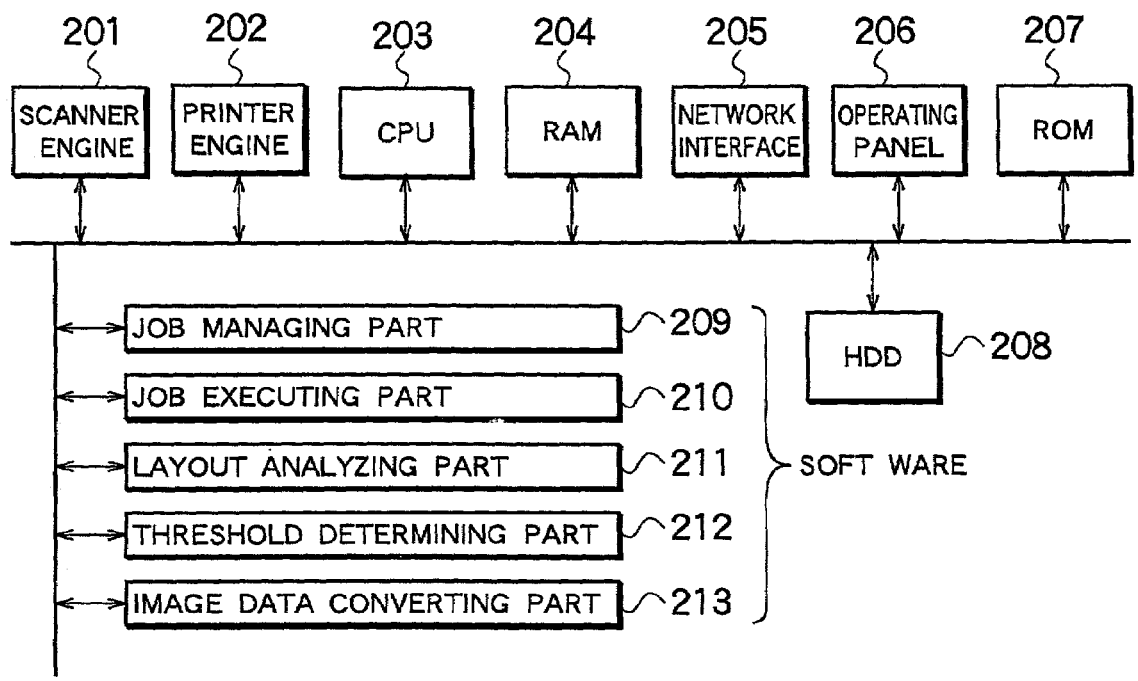
FIG. 2 is a block diagram of a system module of a digital copying machine to which the preferred embodiment of an image reading system according to the present invention can be applied.

Referring to FIG. 2, the functions and constructions of the system of the digital copying machine 103 shown in FIG. 1 will be described below.

The interior of the digital copying machine 103 comprises a scanner engine 201, a printer engine 202, a CPU 203, a RAM 204, a network interface 205, an operating panel 206, a ROM 207 and an HDD 208. The scanner engine 201 is a module for scanning an original image, and the printer engine 202 is a module for carrying out printing. The CPU 203, the RAM 204, the ROM 207 and the network interface 205 are hardware elements for system-controlling the digital copying machine 103. The operating panel 206 is a module for controlling the control panel to provide a user interface. The HDD 208 is an HDD for storing image data, which is generated by scanning an original image, and print data for printing.

The software structure for controlling the digital copying machine 103 comprises a job managing part 209, a job executing part 210, a layout analyzing part 211, a threshold determining part 212 and an image data converting part 213. The job managing part 209 is a module for controlling the job executing part 210 to manage a copying job, a scanner job and a print job. The job executing part is a module for actually executing the respective jobs. The layout analyzing part 211 is a module for carrying out a layout analysis which will be described later. The threshold determining part 212 is a module for carrying out a threshold determination which will be described later. The image data converting part 213 is a module for carrying out an image processing for combining two image data to form one image data, which will be described later.

FIG. 3 shows an operating part of the color digital copying machine 103. This operating part comprises a portion called a hard key (a preheat key, an interrupt key, a HELP key, a copy key, a fax key, a printer key, an all clear key, ten keys, a clear/stop key and a start key), and a control panel 400 comprising a touch panel 401. The functions provided by the image reading system according to the present invention are mainly provided by the touch panel 401 and the start key 402. The control panel 400 has a hard key for switching ACS mode/monochromatic mode/full color mode when color copying and color scanning functions are provided.

Figure 4:
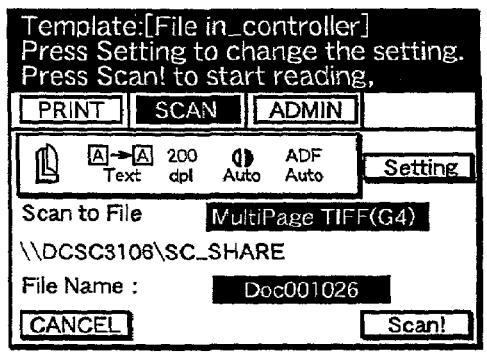
FIG. 4 is a schematic diagram showing a scan parameter summary screen as an example of an image displayed on a touch panel in the digital copying machine of FIG. 3.

FIG. 4 shows an example of an image displayed on the touch panel 401. If the user intends to execute a network scan job, the user carries out a scan setting shown in FIG. 4, and thereafter, the user depresses a scan icon or the start key, so that the scan job starts. A portion which is herein displayed as "MultiPage TIFF (G4)" to be reversed is an icon. If this portion is depressed by the user, a screen transition is executed. In this case, the screen shown in FIG. 4 is changed to a screen shown in FIG. 5.

Figure 5:
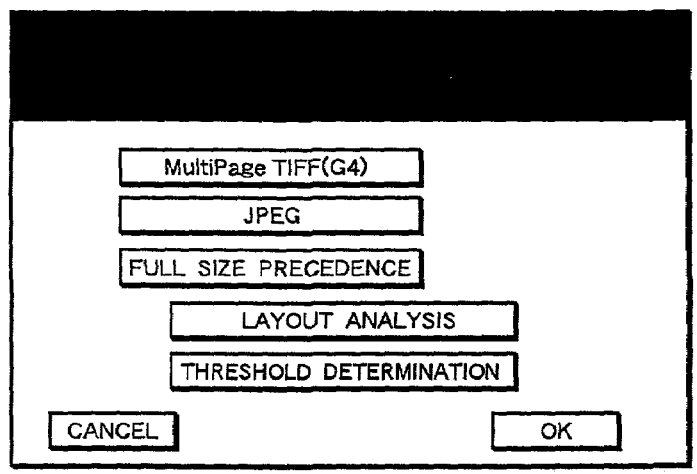
FIG. 5 is a schematic diagram showing a scan parameter summary screen (file format selection) for assigning a file format in a scan setting in the digital copying machine of FIG. 3.

FIG. 5 shows a screen for assigning a file format in the scan setting. As the file format, "MultiPage TIFF (G4)", "SinglePage TIFF (G4)", "PDF", "JPEG" or "File Size Precedence" can be selected. If the "File Size Precedence" is selected, the "layout analysis" or the "threshold determination" is alternatively selected. If a "CANCEL" or "OK" icon is depressed, the screen returns to the screen shown in FIG. 4.

As the file formats of the "File Size Precedence", image file formats, such as "JPEG 2000", "FIFF FX", "PDF" and "DjVu (see http://www. Djvu.com)", are well known as image formats capable of structuring in page, and these image formats are used.

Figure 6:
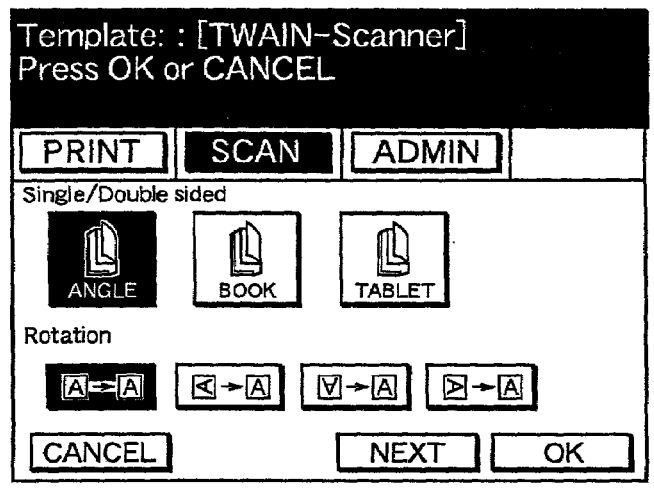
FIG. 6 is a schematic diagram showing a scan parameter setting screen (No. 1) in the digital copying machine of FIG. 3.
Figure 7:
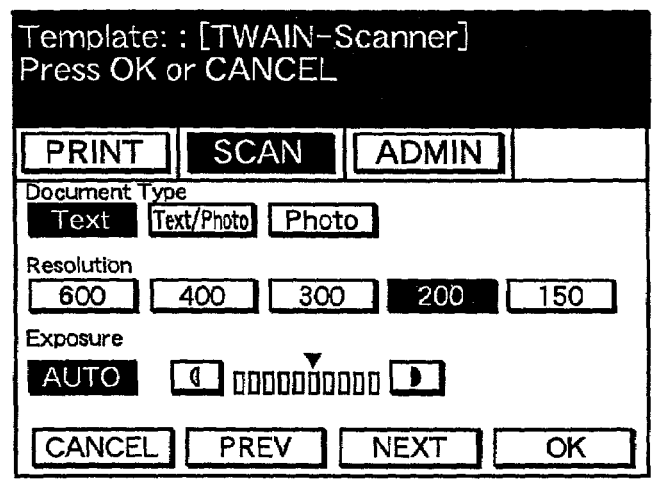
FIG. 7 is a schematic diagram showing a scan parameter setting screen (No. 2) in the digital copying machine of FIG. 3.
Figure 8:
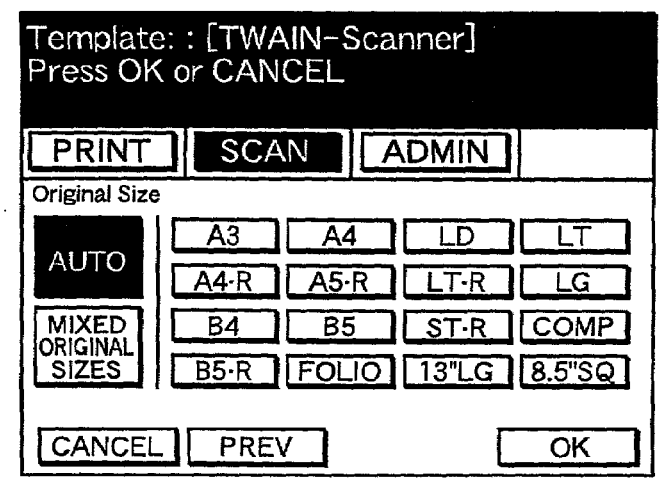
FIG. 8 is a schematic diagram showing a scan parameter setting screen (No. 3) in the digital copying machine of FIG. 3.

FIGS. 6 through 8 show scan parameter setting screens. Parameters capable of being assigned as scan parameters by the user from a liquid crystal display (LCD) include "Both Faces/Single Face (Single/Book/Tablet)", "Rotation", "Document Type", "Resolution", "Exposure Level" and "Original Size".

Referring to FIGS. 9 through 12, an image reading method in the preferred embodiment of an image reading system according to the present invention will be described below.

Figure 9:
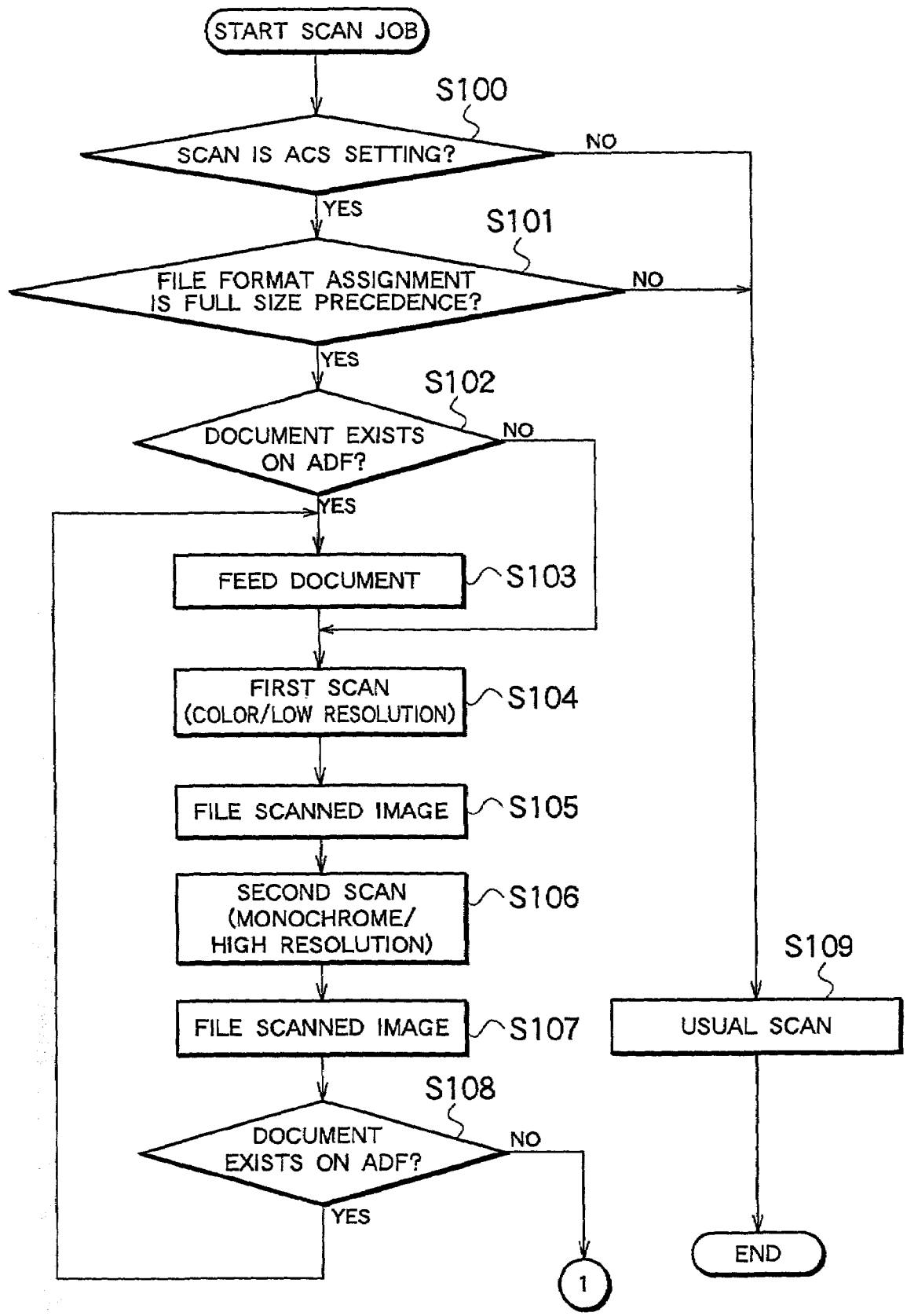
FIG. 9 is a flow chart showing the flow of a twice scanning processing in the preferred embodiment of an image reading system according to the present invention.

FIG. 9 shows the flow of a twice scanning processing in the image reading system according to the present invention.

First, if the user puts a color/monochrome mixing original on an automatic document feeder (ADF) of the digital copying machine 103 and depresses a "Scan!" icon or the start key, a scan job starts. After the scan job starts, it is checked whether a scanning operation is carried out in the ACS mode (S100). If the scanning operation is carried out in the ACS mode (Yes at S100), it is checked whether the file format assignment has been set to be the "File Size Precedence" (S101). If the "File Size Precedence" is set (Yes at S101), a twice scanning operation is executed. First, it is checked whether the original exists on the ADF (S102). If the original exists on the ADF (Yes at S102), it is recognized that an ADF scanning job should be carried out, and the original is fed (S103) to execute a first scanning operation at a color low resolution, e.g., at a setting of 100 dpi (S104). After the first scanning operation is completed, an image read as RGB data is filed (S105). One image is filed every one page. Then, a second scanning operation is executed at a monochromatic high resolution, e.g., at a setting of 600 dpi (S106). Thereafter, an image read as monochromatic data is filed (S107). After the filing is completed, it is determined again whether the original exists on the ADF. If the original exists on the ADF (Yes at S108), the processing at step S103 or thereafter is carried out again in order to continue the ADF scanning. If the original does not exist on the ADF (No at S108), it is determined that the ADF scan job is completed, and the routine goes to step S200 in FIG. 10.

In addition, if the original does not exist on the ADF at step S102, it is recognized that a manual scanning operation should be carried out, and the original arranged on the ADF is scanned twice every one page by the same procedure. If it is NO at steps S100 and S101, a usual single scanning is carried out (S109).

Figure 10:
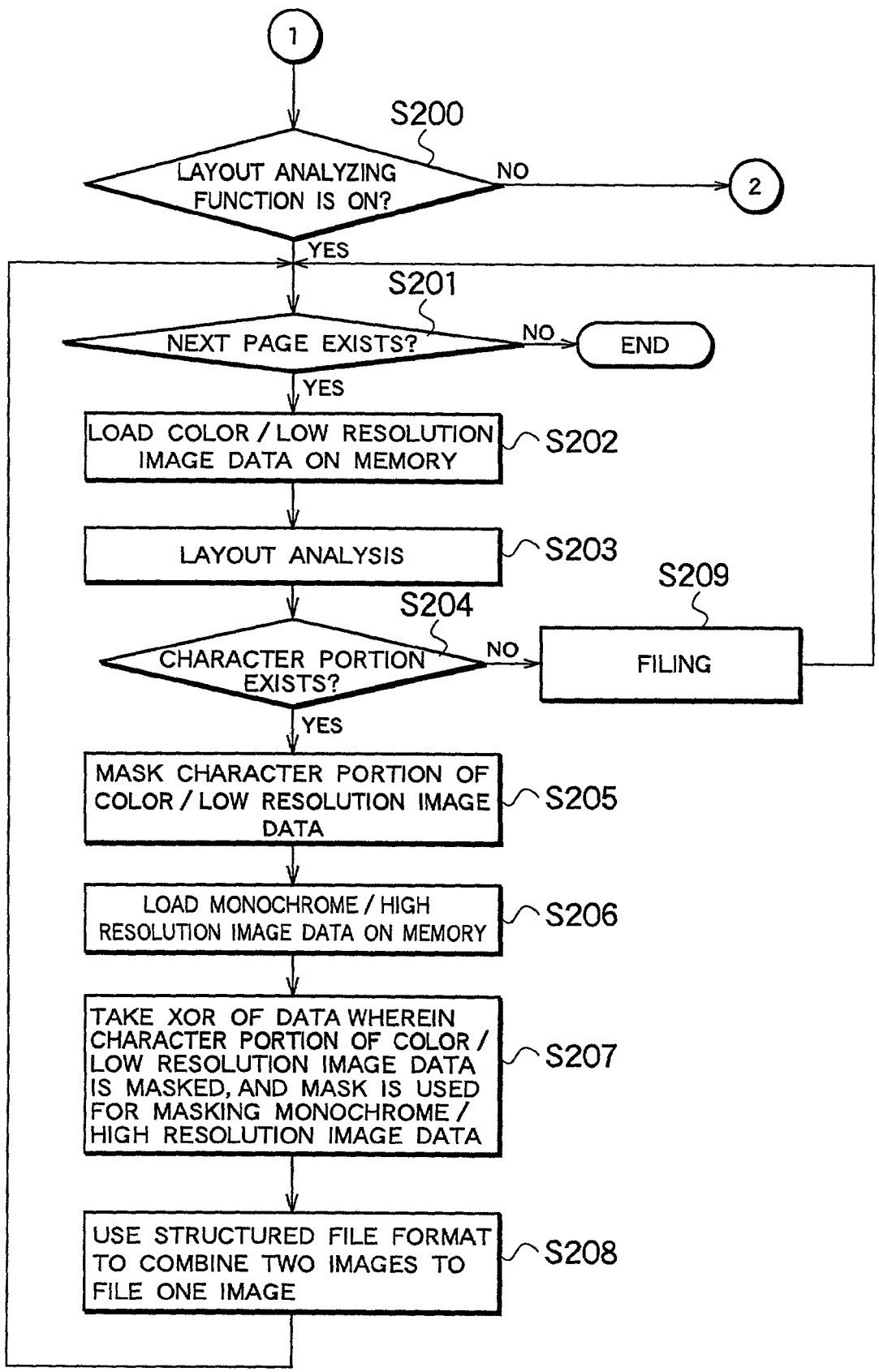
FIG. 10 is a flow chart showing the flow of a data merge processing (a layout analyzing function) in the preferred embodiment of an image reading system according to the present invention.

FIG. 10 shows the flow of a data merge processing (a layout analyzing function) in the preferred embodiment of an image reading system according to the present invention.

First, after the twice scanning operation shown in FIG. 9 is completed, it is determined whether the layout analyzing function is ON (S200). If the layout analyzing function is ON (Yes at S200), a directory in the HDD scanned at a color low resolution to be image-filed is examined to determine whether the next page image data exists (S201). If the next page image data exists (Yes at S201), a color low resolution image data of one page is loaded on the memory (S202). Then, a layout analysis is carried out with respect to the image data loaded on the memory (S203). The layout analyzing function is the function of carrying out a layout analysis as an image structure of one page to distinguish a character portion from an image portion. This function is well known. Then, as a result of the layout analysis, it is determined whether the character portion exists (S204). It is determined that the character portion exists in page data (Yes at S204), the character portion of the color low resolution image data is masked (S205). Then, a monochromatic high resolution image data which is image data of the same page as the page of the color low resolution image data developed on the memory is loaded on the memory (S206). Then, with respect to the monochromatic high resolution image data loaded on the memory, the XOR (Inclusive OR) of data obtained by masking the character portion of the color low resolution image data is taken, and the data, the XOR of which has been taken, is used for masking the monochromatic high resolution image data (S207). Then, a structuring file format is used for combining two images to form a single image to file the image (S208). Then, the routine returns to step S201, and the image data merge processing is repeated until page data disappears.

Figure 11:
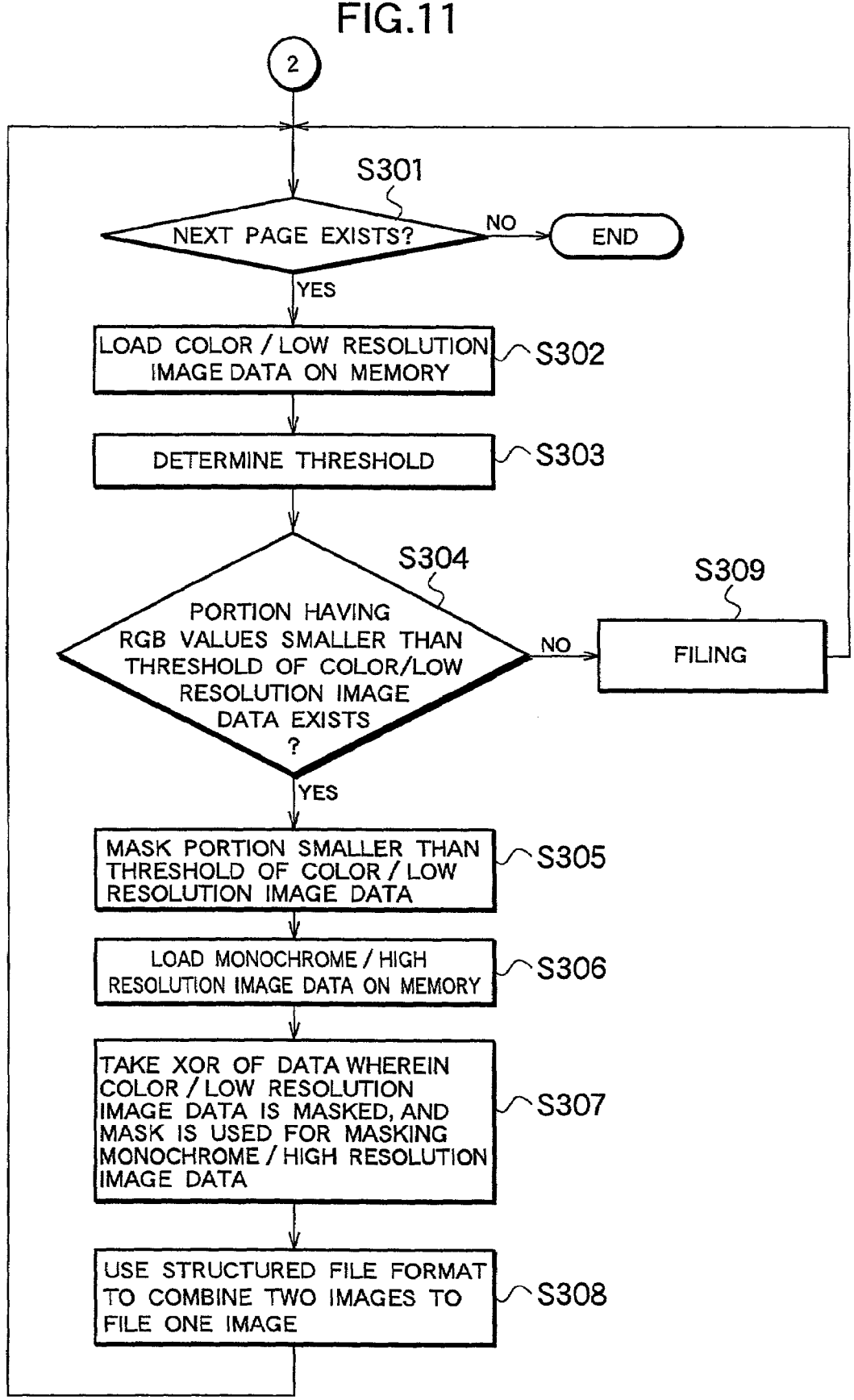
FIG. 11 is a flow chart showing the flow of the data merge processing (the layout analyzing function) in the preferred embodiment of an image reading system according to the present invention.

On the other hand, if the layout analyzing function is OFF at step S200, the routine goes to step S301 of FIG. 11.

FIG. 11 shows the flow of a data merge processing (a threshold analyzing function) in the preferred embodiment of an image reading system according to the present invention.

First, if the layout analyzing function is OFF at step S200 of FIG. 10, a directory of the HDD scanned at a color low resolution to be image-filed is examined to determine whether the next page image data exists (S301). If the next page image data exists (Yes at S301), a color low resolution image data of one page is loaded on the memory (S302). Then, a threshold analysis is carried out with respect to the image data loaded on the memory (S303). The threshold analyzing function is the function of carrying out an RGB threshold analysis every pixel to distinguish a monochromatic portion from a color portion. For example, if the respective threshold values of RGB are set to be approximately zero, it can be used for the determination that the portion is black. There is an advantage in that this method can determine portions by a lighter processing than the layout analysis. Then, as a result of the threshold analysis, it is determined whether the monochromatic portion exists (S304). It is determined that the monochromatic portion exists in page data (Yes at S304), the character portion of the color low resolution image data is masked (S305). Then, a monochromatic high resolution image data which is image data of the same page as the page of the color low resolution image data developed on the memory is loaded on the memory (S306). Then, with respect to the monochromatic high resolution image data loaded on the memory, the XOR of data obtained by masking the portion determined as the monochromatic portion of the color low resolution image data is taken, and the data, the XOR of which has been taken, is used for masking the monochromatic high resolution image data (S307). Then, a structuring file format is used for combining two images to form a single image to file the image (S308). Then, the routine returns to step S301, and the image data merge processing is repeated until page data disappears.

On the other hand, if the threshold analyzing function is OFF at step S301, the processing is completed.

Figure 12:
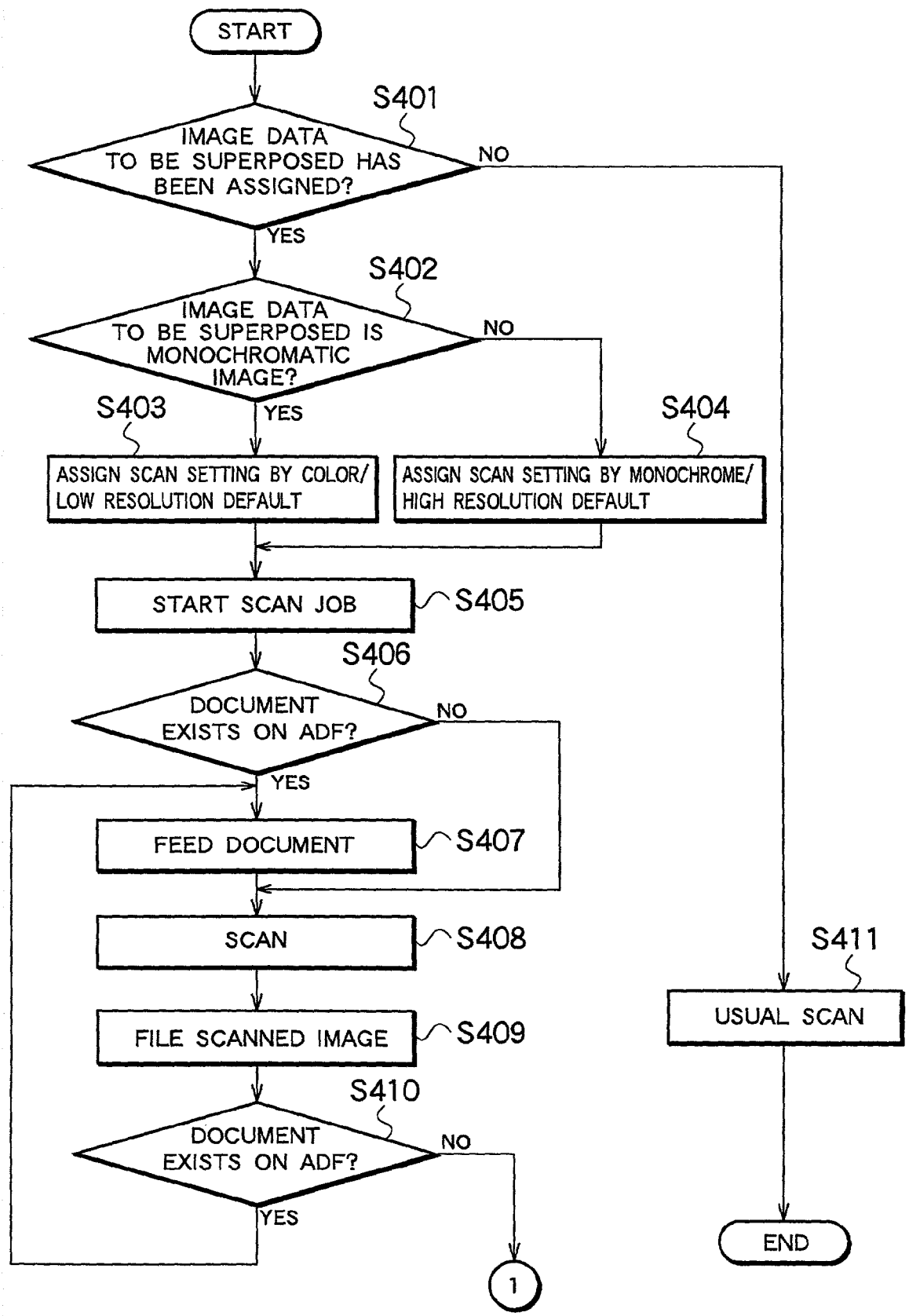
FIG. 12 is a flow chart showing the flow of a processing for superposing image data on a file which has been stored.

FIG. 12 shows the flow of a processing for superposing on a file, which has been stored, in the preferred embodiment of an image reading system according to the present invention.

First, it is determined whether a file to be image-superposed has been assigned by the user from image data which has been generated by scanning the original image (S401). If the file to be image-superposed has not been assigned (No at S401), a usual scanning processing is executed (S411). On the other hand, the file to be image-superposed has been assigned (Yes at S401), it is determined whether data of the assigned file is monochromatic data or color data (S402). If the data of the assigned file is monochromatic data (Yes at S402), a setting of "color low resolution" is used by default with respect to the scan setting for scanning an image to be superposed. Furthermore, this default setting is a parameter capable of being changed before the user scans the original image. On the other hand, if it is NO at step S402 (the data of the assigned file is color data), the default of the scan setting is the setting of the "monochromatic high resolution". Thereafter, the user starts a scan job (S405). The scan job is started by depressing the "Scan!" icon or the start key in FIG. 4. Thereafter, a single scanning operation is carried out (S407 through S410) since the file to be superposed has existed. Thereafter, the routine goes to step S200 in FIG. 10.

Figure 13:
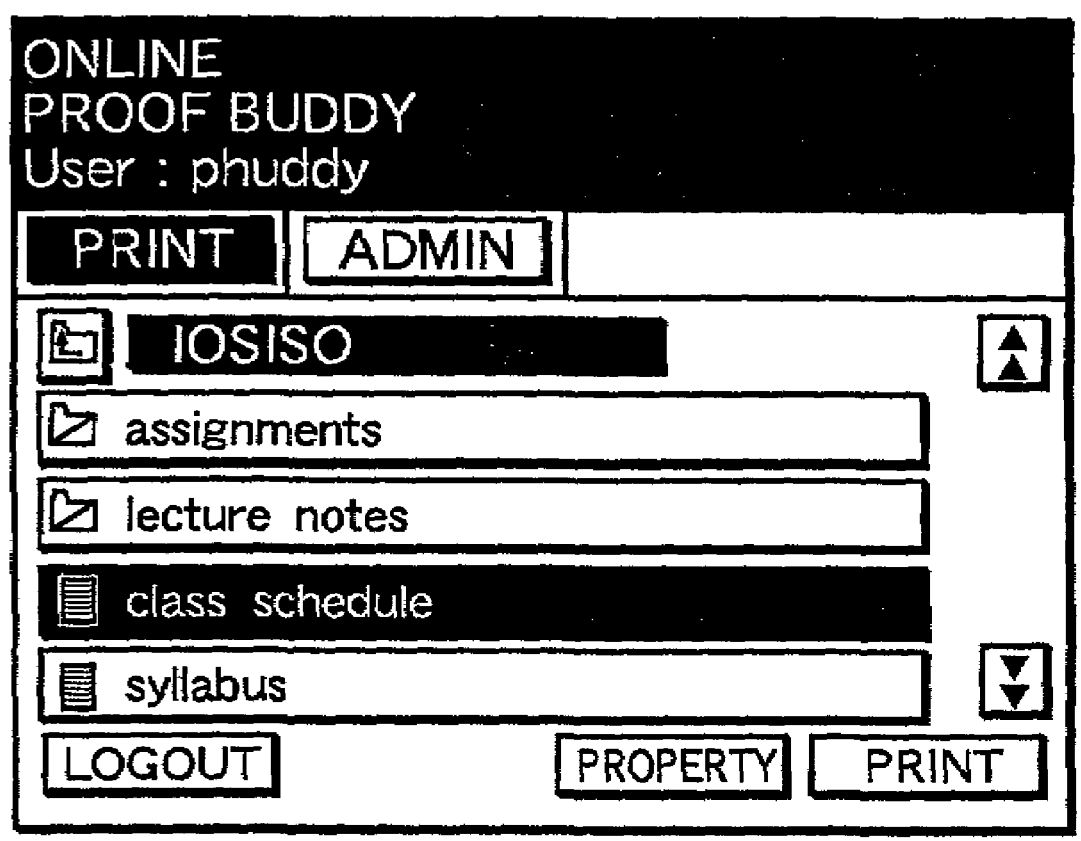
FIG. 13 is a schematic diagram showing an example of a file superposing screen in the preferred embodiment of an image reading system according to the present invention.

FIG. 13 shows an example of a screen for superposing a file in the preferred embodiment of an image reading system according to the present invention.

In the function of superposing the scanned images, an image processing for superposing data, which has been scanned to be filed, on image data to be scanned is carried out. A user interface for superposing image data on which data having been scanned to be filed is provided for the user. In this case, the file structure is expressed by icons. In addition, "class schedule" and "syllabus" show files, and it is shown that an image file of "¥ICS180¥ class schedule" has been selected.

What is claimed is:

1. An image reading system, comprising:
  image reading means for scanning an original image to generate an image data;
  storage means for storing said image data; and
  image processing means for using a predetermined criterion to merge a plurality of image data to convert said plurality of image data to one image data when said storage means stores said plurality of image data,
  wherein when said storage means stores a color low resolution image data and a monochromatic high resolution image data, said image processing means carries out an image processing for regarding a pixel of a predetermined threshold or less as a monochromatic pixel in said color low resolution image data to mask said pixel with white, and for replacing said pixel with said monochromatic high resolution image data.

2. The image reading system as set forth in claim 1, which further comprises threshold setting means for allowing a user to set a threshold.

3. The image reading system as set forth in claim 2, wherein said threshold setting means is provided by a liquid crystal display or a UNIX international (UI) such as Web.

4. The image reading system as set forth in claim 2, wherein said threshold setting means is an instruction sheet.

5. An image reading system, comprising:
  image reading means for scanning an original image to generate an image data;
  storage means for storing said image data; and
  image processing means for using a predetermined criterion to merge a plurality of image data to convert said plurality of image data to one image data when said storage means stores said plurality of image data,
  wherein when said storage means stores a color low resolution image data and a monochromatic high resolution image data, said image processing means carries out an image processing for regarding a portion of a predetermined evaluation function as a monochromatic portion in said color low resolution image data to mask said portion with white, and for replacing said portion with said monochromatic high resolution image data.

6. A method for reading an image, comprising:
scanning an original image to generate an image data;
storing said image data;
using a predetermined criterion to merge a plurality of image data to convert said plurality of image data to one image data when said plurality of image data are stored;
storing a color low resolution image data and a monochromatic high resolution image data;
carrying out an image processing for regarding a pixel of a predetermined threshold or less as a monochromatic pixel in said color low resolution image data to mask said pixel with white; and
replacing said pixel with said monochromatic high resolution image data.

7. The method for reading an image as set forth in claim 6, which further comprises allowing a user to set a threshold.

8. The method for reading an image as set forth in claim 7, which further comprises providing a liquid crystal display or a UNIX international (UI) such as Web to set the threshold.

9. The method for reading an image as set forth in claim 7, which further comprises an instruction sheet to set the threshold.

10. An image reading system, comprising:
a scanner that scans an original image to generate an image data;
a storage device that stores said image data; and
a processor that uses a predetermined criterion to merge a plurality of image data to convert said plurality of image data to one image data when said storage device stores said plurality of image data,
wherein when said storage device stores a color low resolution image data and a monochromatic high resolution image data, said processor carries out an image processing for regarding a pixel of a predetermined threshold or less as a monochromatic pixel in said color low resolution image data to mask said pixel with white, and for replacing said pixel with said monochromatic high resolution image data.

11. The image reading system as set forth in claim 10, which further comprises a control panel that allows a user to set a threshold.

12. The image reading system as set forth in claim 11, wherein said control panel is provided by a liquid crystal display or a UNIX international (UI) such as Web.

13. The image reading system as set forth in claim 11, wherein said control panel is an instruction sheet.

* * * * *